United States Patent
Manula et al.

(10) Patent No.: US 7,257,758 B1
(45) Date of Patent: Aug. 14, 2007

(54) STUMPING MECHANISM

(75) Inventors: Brian Manula, Oslo (NO); Ali Bozkaya, Oslo (NO); Magne Sanduen, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 508 days.

(21) Appl. No.: 10/863,372

(22) Filed: Jun. 8, 2004

(51) Int. Cl.
*H03M 13/00* (2006.01)

(52) U.S. Cl. ............... 714/752; 714/758; 379/399.02; 702/189

(58) Field of Classification Search ............... 714/775, 714/752, 758; 379/399.02; 702/189

See application file for complete search history.

(56) References Cited

U.S. PATENT DOCUMENTS

| | | | |
|---|---|---|---|
| 5,956,102 A * | 9/1999 | Lane | 348/425.4 |
| 2003/0005039 A1* | 1/2003 | Craddock et al. | 709/203 |
| 2003/0093627 A1* | 5/2003 | Neal et al. | 711/153 |
| 2004/0039986 A1* | 2/2004 | Solomon et al. | 714/799 |

* cited by examiner

*Primary Examiner*—Guy J. Lamarre
(74) *Attorney, Agent, or Firm*—Park, Vaughan & Fleming, LLP

(57) ABSTRACT

An Infiniband device can have an input port operable to receive a packet and to forward the packet to an output port of the device for onward transmission toward an ultimate destination of the packet. The input port can also be operable to examine at least a header portion of the packet to determine a transmission validity status of the packet and in the event of a negative transmission validity status being determined, to truncate the packet to remove a data payload from the packet including regenerating a checksum field of the packet on the basis of a truncated size of the packet.

8 Claims, 11 Drawing Sheets abcdefgh ijklmnop

Byte 1   Byte 2

FIGURE 15a ijklmnop  abcdefgh

Byte 1   Byte 2

FIGURE 15b ponmlkji  hgfedcba

Byte 1   Byte 2

FIGURE 15c

STUMPING MECHANISM

RELATED APPLICATIONS

The present application is related to the following applications, all of which are filed on the same day and assigned to the same assignee as the present application:

U.S. patent application Ser. No. 10/863,019, entitled, "METHOD AND APPARATUS FOR VERIFYING SERVICE LEVEL IN A COMMUNICATIONS NETWORK," by inventors Bjorn Dag Johnsen, Christopher Jackson, David Brean and Ola Torudbakken;

U.S. patent application Ser. No. 10/863,016, entitled, "SWITCH METHOD AND APPARATUS WITH CUT-THROUGH ROUTING FOR USE IN A COMMUNICATIONS NETWORK," by inventors Bjorn Dag Johnsen, Hans Rygh and Morten Schanke;

U.S. patent application Ser. No. 10/862,970, entitled, "SWITCHING METHOD AND APPARATUS FOR USE IN A COMMUNICATIONS NETWORK," by inventors Bjorn Dag Johnsen, Christopher Jackson, David Brean, Ola Torudbakken, Steinar Forsmo, Hans Rygh, Morten Schanke;

U.S. patent application Ser. No. 10/863,854, entitled, "METHOD AND APPARATUS FOR SOURCE AUTHENTICATION IN A COMMUNICATIONS NETWORK," by inventors Bjorn Dag Johnsen, Christopher Jackson, David Brean, Ola Torudbakken;

U.S. patent application Ser. No. 10/863,373, entitled, "CREDIT ANNOUNCEMENT," by inventors Morten Schanke, Hans Rygh, Marius Hansen and Mathias Hoddevik;

U.S. patent application Ser. No. 10/862,987, entitled, "ADAPTIVE CUT-THROUGH ALGORITHM," by inventors Morten Schanke, Brian Manula and Magne Sandven;

U.S. patent application Ser. No. 10/863,374, entitled, "COMMA DETECTION," by inventors Magne Sandven, Morten Schanke and Brian Manula;

U.S. patent application Ser. No. 10/862,985, entitled, "SERVICE LEVEL TO VIRTUAL LANE MAPPING," by inventors Steinar Forsmo, Hans Rygh and Ola Torudbakken;

U.S. patent application Ser. No. 10/863,038, entitled, "INPUT AND OUTPUT BUFFERING," by inventors Hans Rygh, Morten Schanke, Ola Torudbakken and Steinar Forsmo;

U.S. patent application Ser. No. 10/863,439, entitled, "CODEC IMPLEMENTATION FOR INFINIBAND," by inventors Steinar Forsmo, Mathias Hoddevik and Magne Sandven;

U.S. patent application Ser. No. 10/863,013, entitled, "VCRC CHECKING AND GENERATION," b inventors Steinar Forsmo, Hans Rygh, Morten Schanke and Ola Torudbakken;

U.S. patent application Ser. No. 10/863,544, entitled, "COMMUNITY SEPARATION ENFORCEMENT," by inventors Ola Torudbakken and Bjorn Dag Johnsen.

The above-identified applications are all hereby incorporated by reference into the present application.

FIELD

The present invention relates to a stumping mechanism, and in particular but not exclusively to an optimised VCRC stumping mechanism for an Infiniband device such as a switch.

INTRODUCTION

In switches for Infiniband™ networks, there is a general requirement to reduce the latency through the switch such that transmission times of packets across the network can be reduced. One area in which latency can be introduced is where a packet requires truncation for some reason. According to the Infiniband specification, truncation can be required at very specific points within the packet. A decision as to whether a packet must be truncated cannot be made until a sufficient proportion of the packet has been received. Thus the packet must be stored until sufficient of the packet has been received to determine whether stumping must occur.

SUMMARY OF THE INVENTION

The present invention has been made, at least in parts, in consideration of problems and drawbacks of conventional systems.

Viewed from a first aspect, the present invention provides an Infiniband device that can have an input port operable to receive a packet and to forward the packet to an output port of the device for onward transmission toward an ultimate destination of the packet. The input port can also be operable to examine at least a header portion of the packet to determine a transmission validity status of the packet and in the event of a negative transmission validity status being determined, to truncate the packet to remove a data payload from the packet including regenerating a checksum field of the packet on the basis of a truncated size of the packet. This arrangement provides for a latency optimised system for checking incoming packets for illegal partition boundary violations and truncating any packets found to perform such a violation. By this arrangement the transfer of a packet requiring truncation is not delayed by the truncation process.

Further objects and aspects of the invention will become apparent to the skilled reader of the following description and claims.

BRIEF DESCRIPTION OF FIGURES

Specific embodiments of the present invention will now be described by way of example only with reference to the accompanying figures in which:

FIGS. 15a, 15b and 15c are illustrative representations of a bit swap operation.

Figure 1:
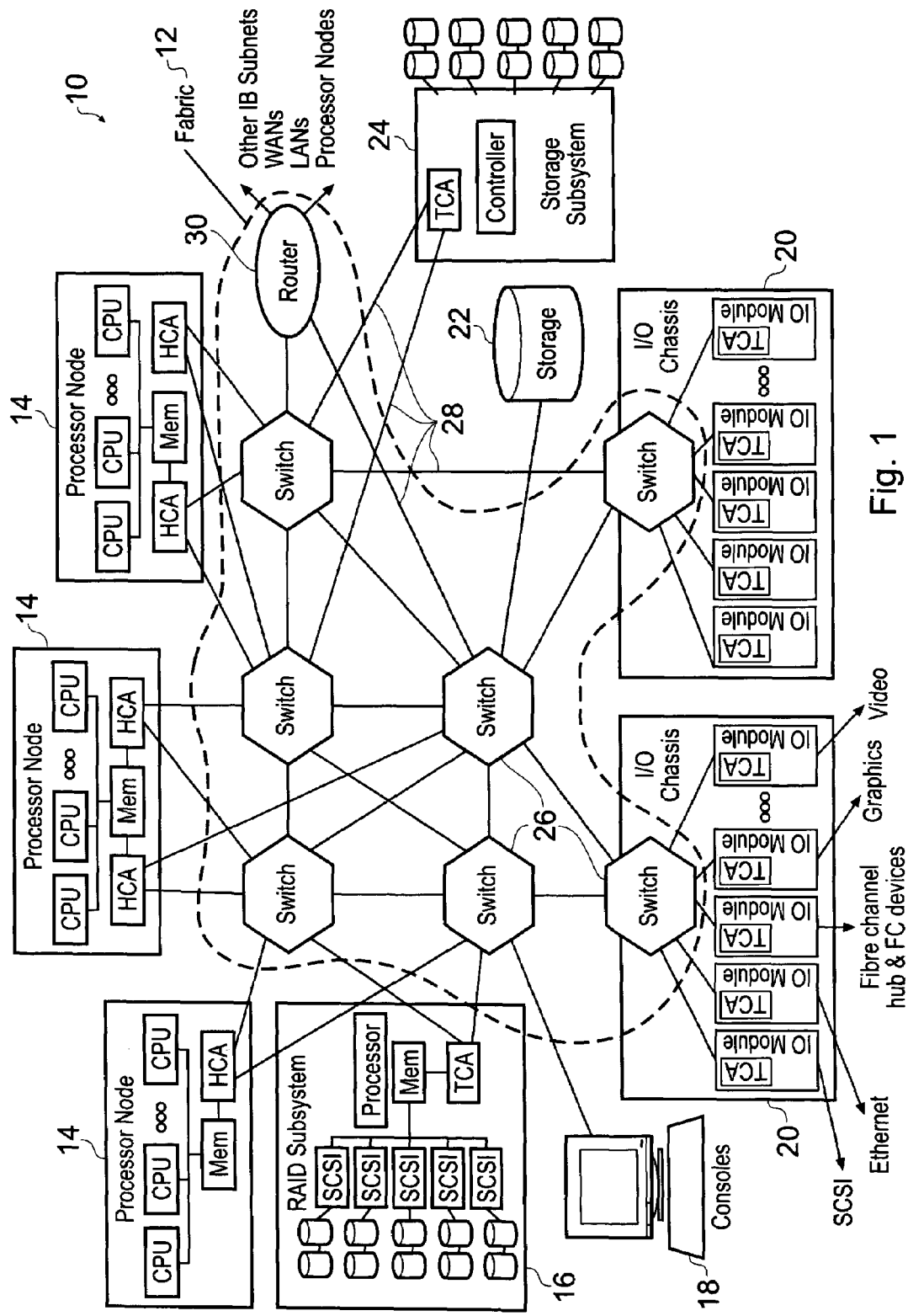
FIG. 1 is a schematic block diagram showing an example of interconnection of computing system elements via the Infiniband™ networking architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
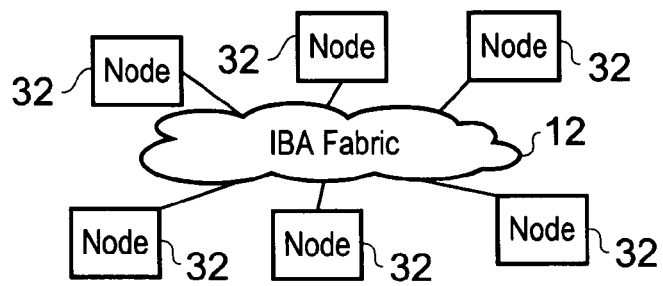
FIG. 2 is a schematic block diagram of a simplified arrangement of an Infiniband™ Architecture system.
Figure 3:
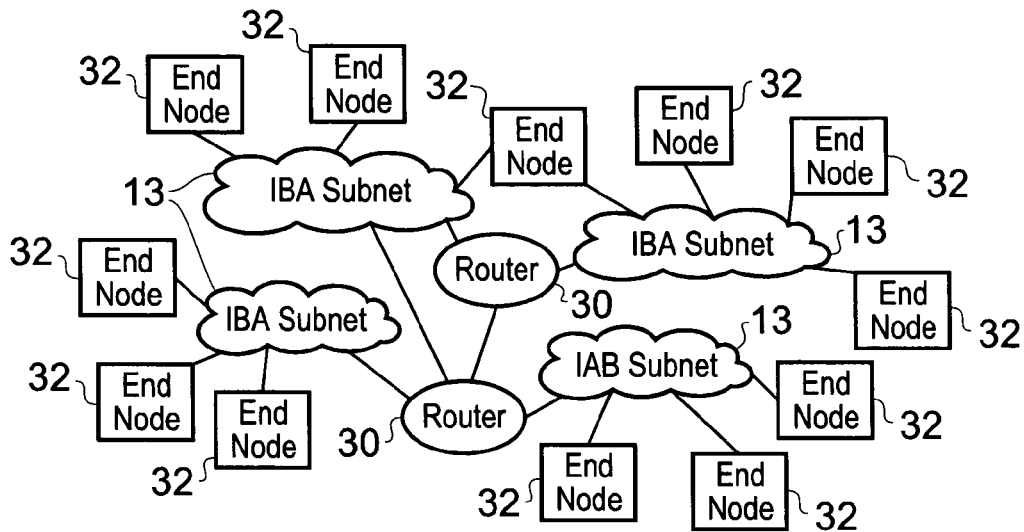
FIG. 3 is a schematic block diagram of another simplified arrangement of an Infiniband™ Architecture system.
Figure 4:
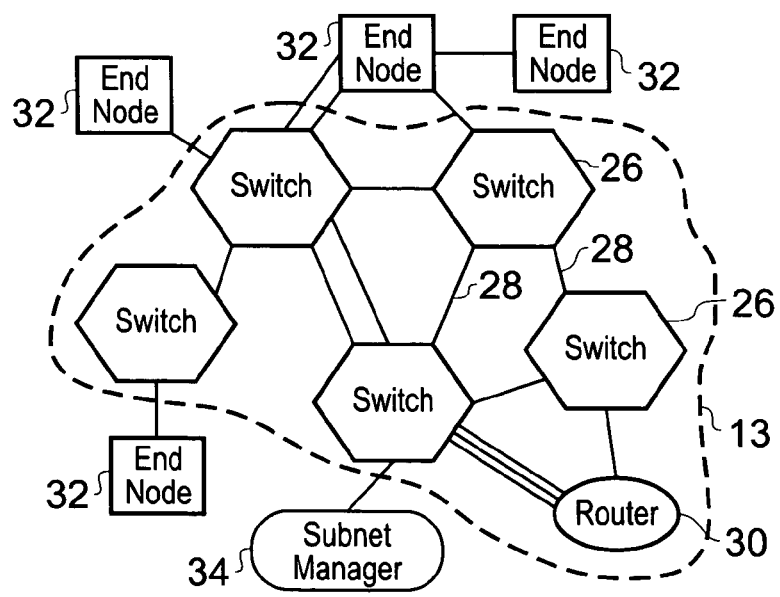
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
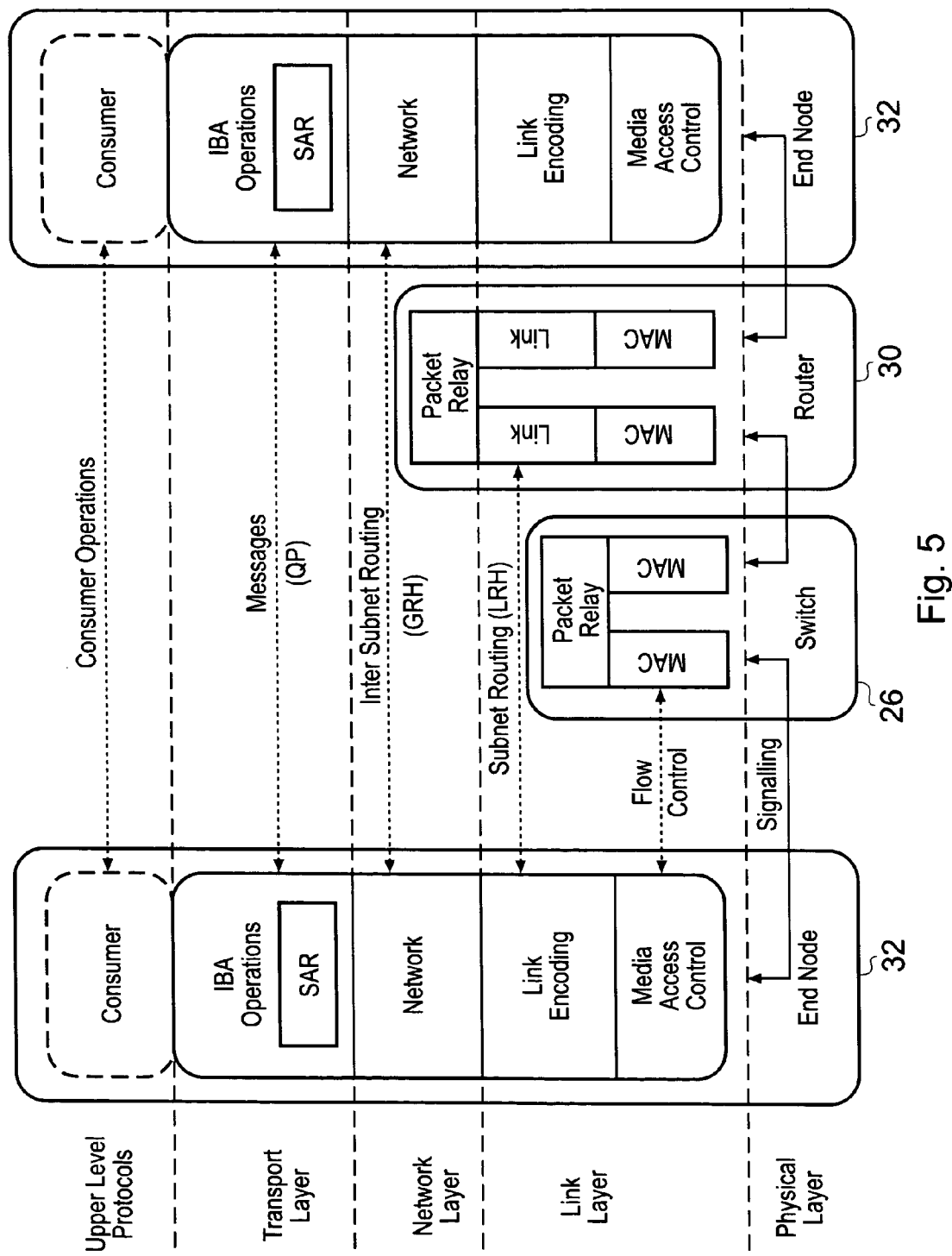
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
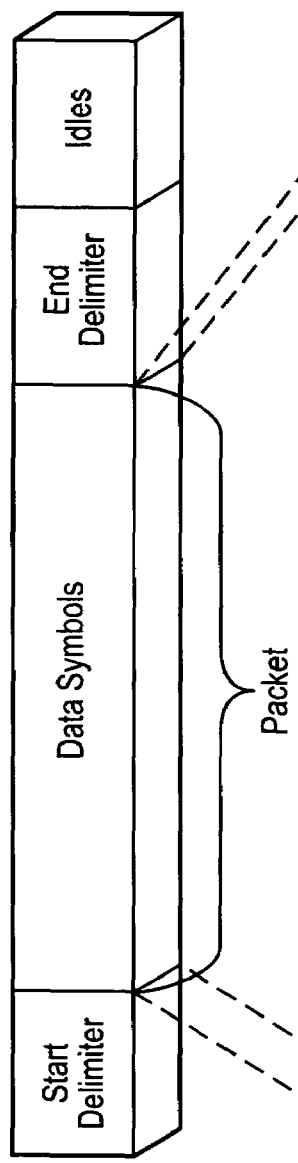
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
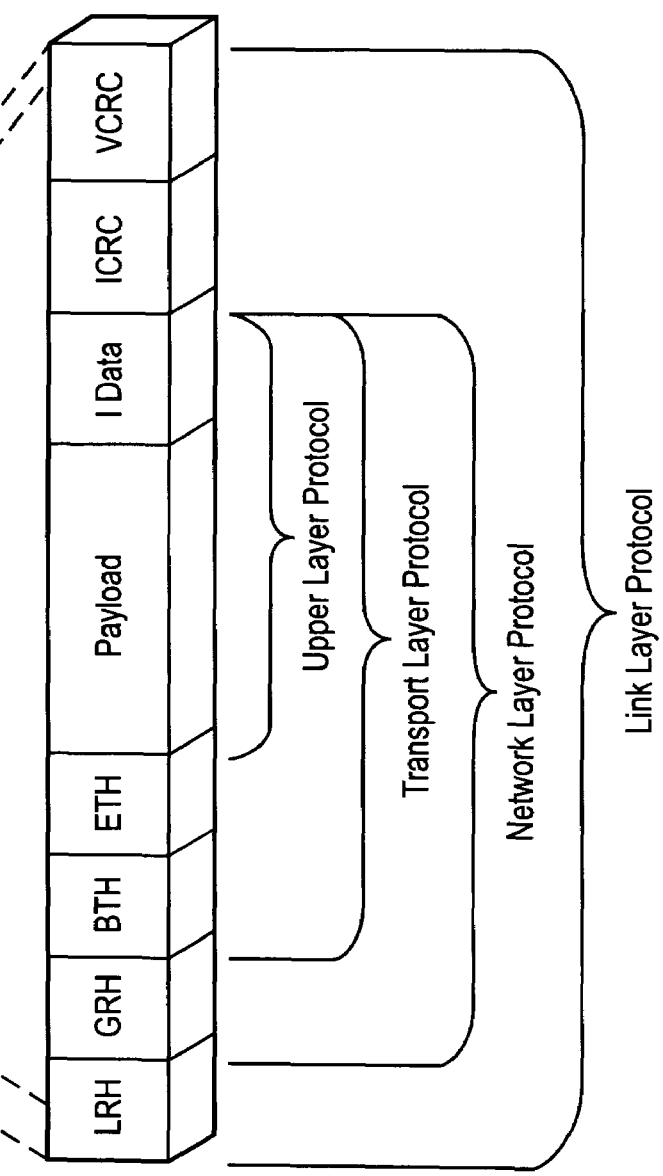
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit".

A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
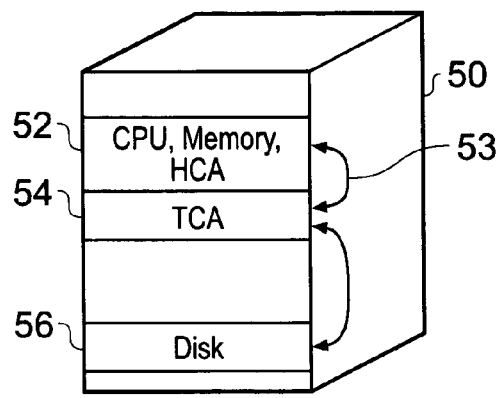
FIG. 8 is a schematic block diagram showing an arrangement where the Infiniband™ Architecture is used to interconnect components within a computer system.
Figure 9:
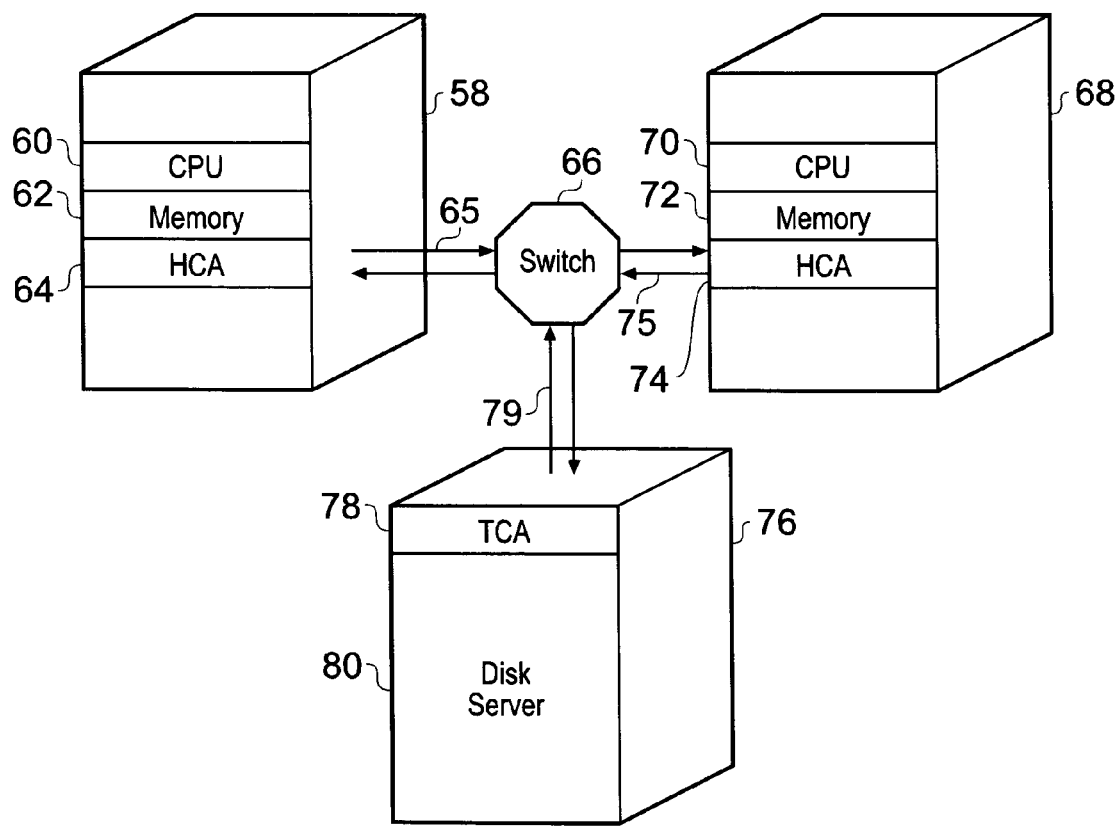
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practised separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
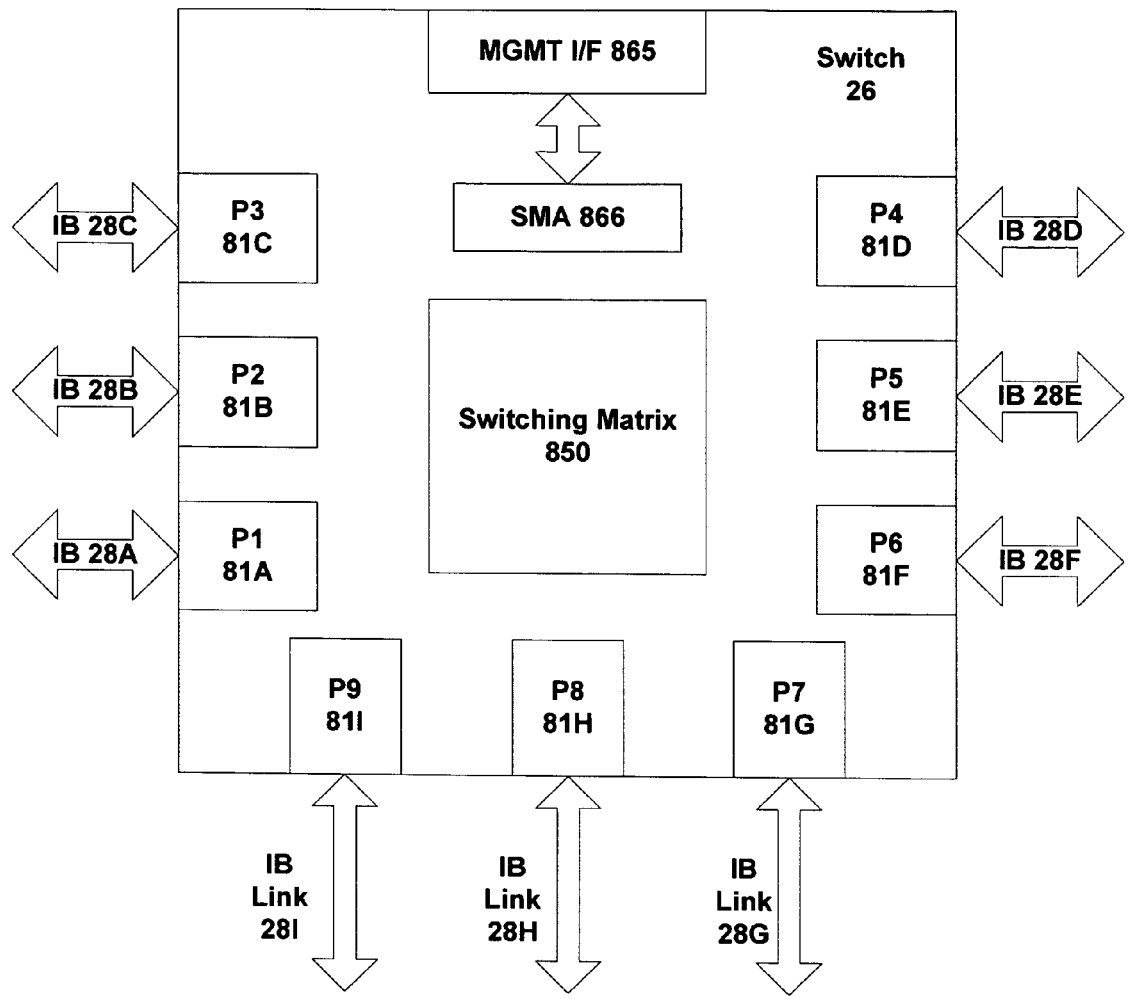
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D and port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

As discussed above, the Infiniband architecture supports the concept of partitioning in order to provide logical isolation of components sharing the same subnet. In order to implement this, packets which attempt to cross a partition between logically isolated subnet areas are truncated to remove any data from the packet. Thus at least a part of the packet header can continue to the stated destination across the partition, but no data is transferred. Thus the existence of a packet trying to cross the partition can be detected to allow any appropriate management or data action to be taken.

Figure 11:
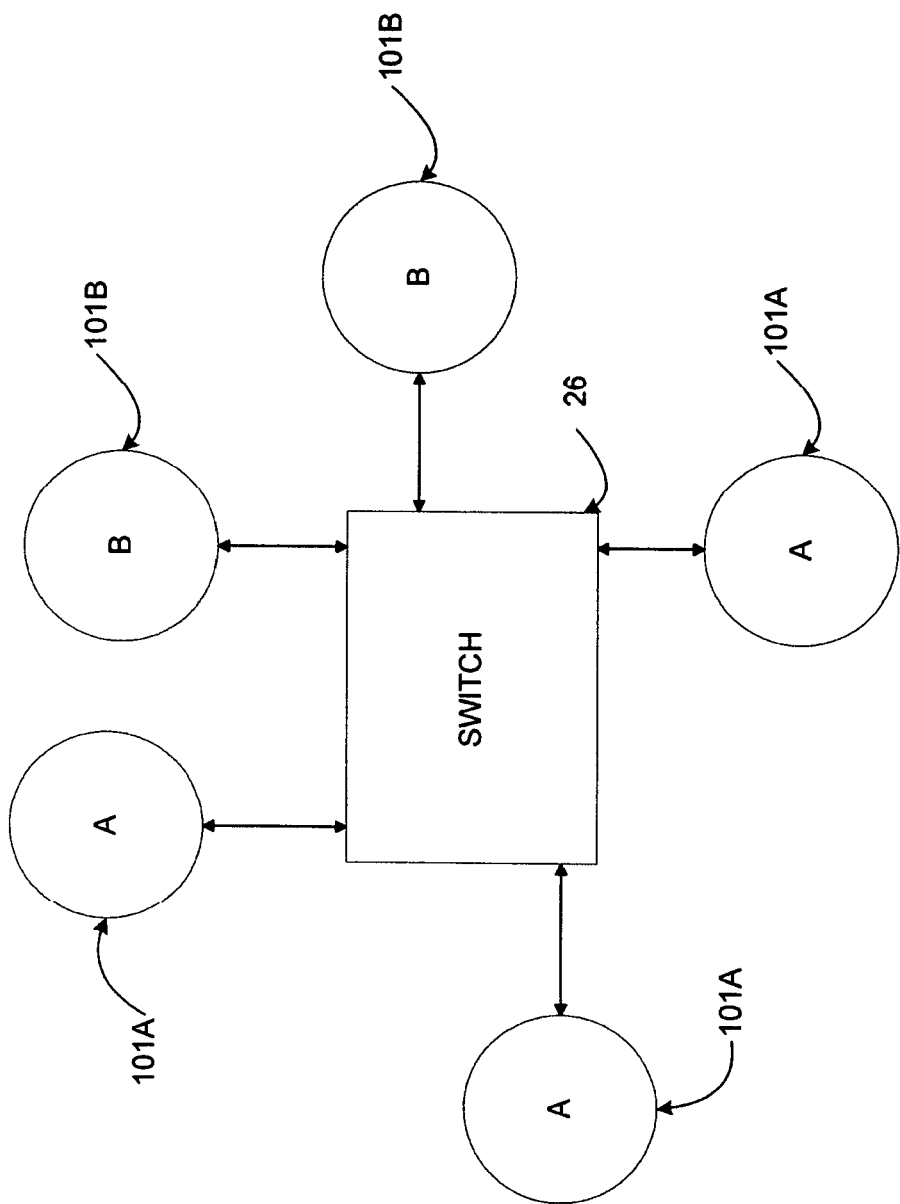
FIG. 11 is a schematic representation of a division of a subnet into logical partitions.

An example of a partitioned subnet is shown in FIG. 11. A number of nodes 101 are connected to a switch 26. Some of those nodes 101A are nodes in partition A, the remaining nodes 101B being in partition B. The nodes 101 can be endnodes or can be fabric extension nodes such as switches and routers. The partitioning rules set out that no packets originating from a node in partition A may be transferred with their data payload to a node in partition B, and likewise no packets originating from a node in partition B may be transferred with their data payload to a node in partition A.

Figure 12:
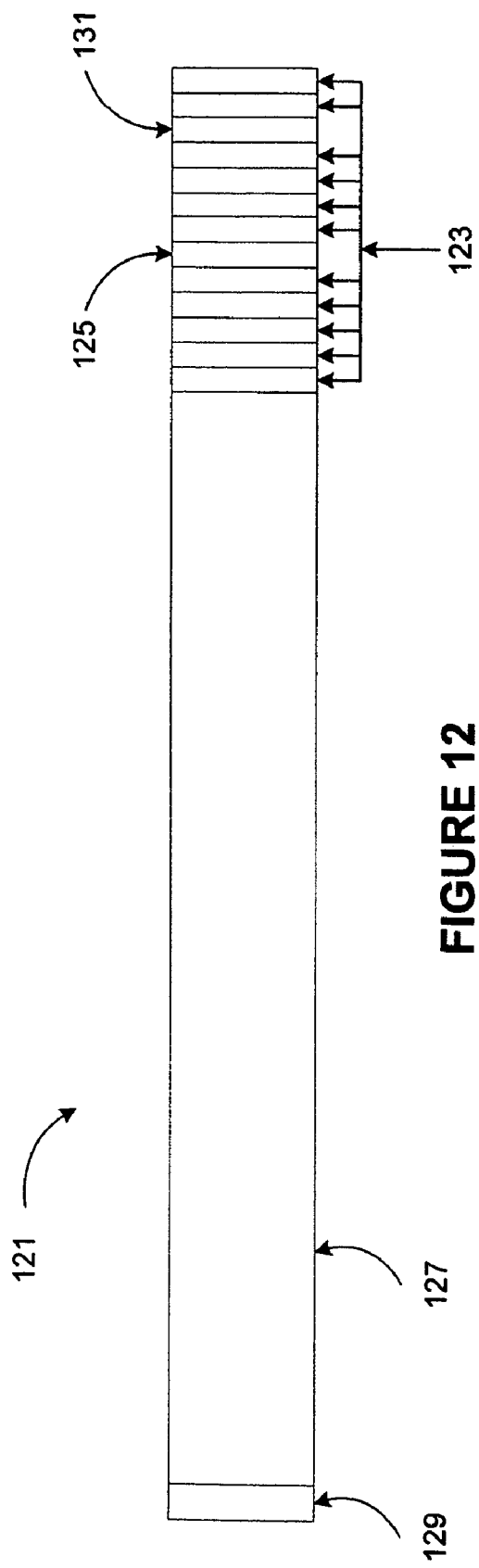
FIG. 12 is a schematic representation of a packet for transmission over the subnet of FIG. 11.

In order to manage the partitioning of nodes, each data packet includes a partition key (P_Key) field. An example of a packet 121 is shown in FIG. 12. The packet 121 has a number of header fields 123, amongst which is a partition key field 125. Following the header fields is the data payload 127 and finally one or more terminator fields 129. The data stored in the partition key field identifies the partition to which the packet belongs. The switch 26 can read this data from the packet to determine whether a packet is illegally attempting to cross the partition boundary.

The Infiniband specification offers two alternatives for dealing with packets which illegally attempt to cross a partition divide. The first option is to drop the packet. The second option is to truncate the packet such that the packet continues on to its destination, but the entire data payload is removed. If the truncation option is used, the Variant Cyclical Redundancy Check (VCRC) field of the packet must be recalculated with the data removed, such that the recipient node of the packet knows that the packet was intentionally truncated and the packet has not experienced a corruption error or other unexplained and unintentional data loss.

In the switch 26 of the present example, the option of dropping the packet is not available. This is because a receiving port 81 of the switch 26 may have commenced onward transmission of the packet through the switch to an output port for that packet prior to the partition key field arriving at that port and being examined to determine whether an illegal partition crossing is occurring. Accordingly, the switch of the present example has to truncate such a packet.

The mechanism used to calculate the VCRC field for the packet uses total packet size. Accordingly, the recalculation of the VCRC field uses a packet size header 131 of the packet. However, in the switch of the present example, the packet size field (which appears before the partition key field in the packet header) may have already been transmitted onward through the switch toward the output port for the packet. Accordingly, that field is not available for the VCRC calculation mechanism to use.

Figure 13:
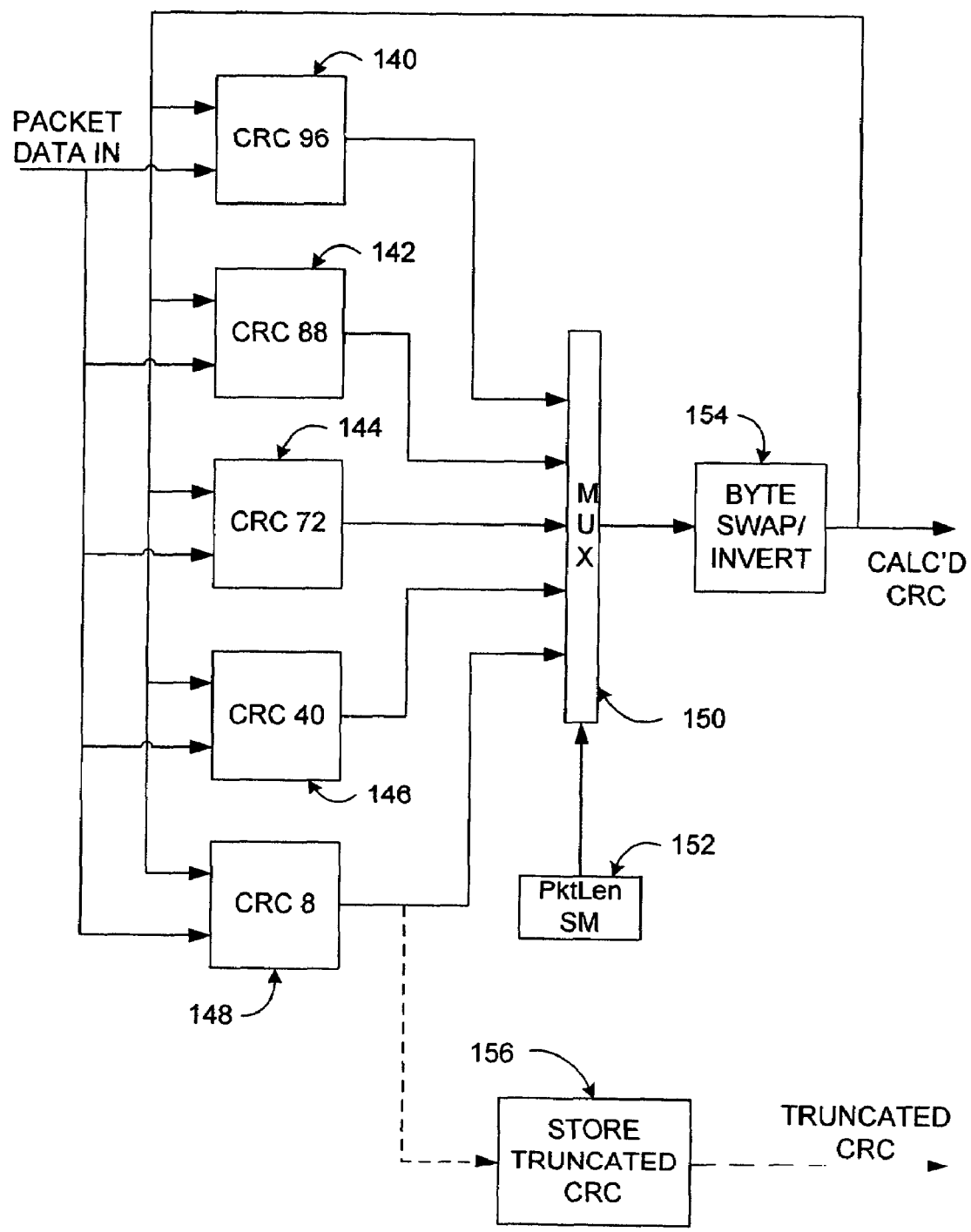
FIG. 13 is a schematic representation of a CRC generator for a port of a switch of FIG. 10.

Thus the switch of the present example recalculates the VCRC filed value on a continuous basis in order to have a new VCRC value available if the packet suddenly requires truncation. The VCRC value is calculated in the present example using a CRC generator as shown in FIG. 13. The CRC generator generates the VCRC for the packet and thus uses the entire packet contents to generate the VCRC value. The CRC generator of the present example performs a running CRC calculation, with the current VCRC value being fed back to be included in calculating the VCRC including the next received chunk of packet.

Due to the way in which Infiniband packets are constructed, the next packet chunk (the amount of data transferred on a single clock cycle) is not of constant size. Therefore a separate CRC calculator is used for each possible size of packet chunk. There are in fact five possible packet chunk sizes: the chunk at the first cycle will always be 88 bits; the chunks at the middle cycles will always be 96 bits; and the chunk at the last cycle can be 8, 40 or 72 bits depending on the total size of the packet. Thus, five CRC calculators are present in the CRC generator of the present example. These are CRC96 140 for working on 96 bit cycles, CRC88 142 for working on 88 bit cycles, CRC72 144 for working on 72 bit cycles, CRC40 146 for working on 40 bit cycles, and CRC8 148 for working on 8 bit cycles.

The five CRC calculators, 140, 142, 144, 146, and 148 all work in parallel using the result of the VCRC from the previous cycle and the data of the current cycle. A multiplexer 150 is used to select between the cycles on the basis of the packet length.

Figure 14:
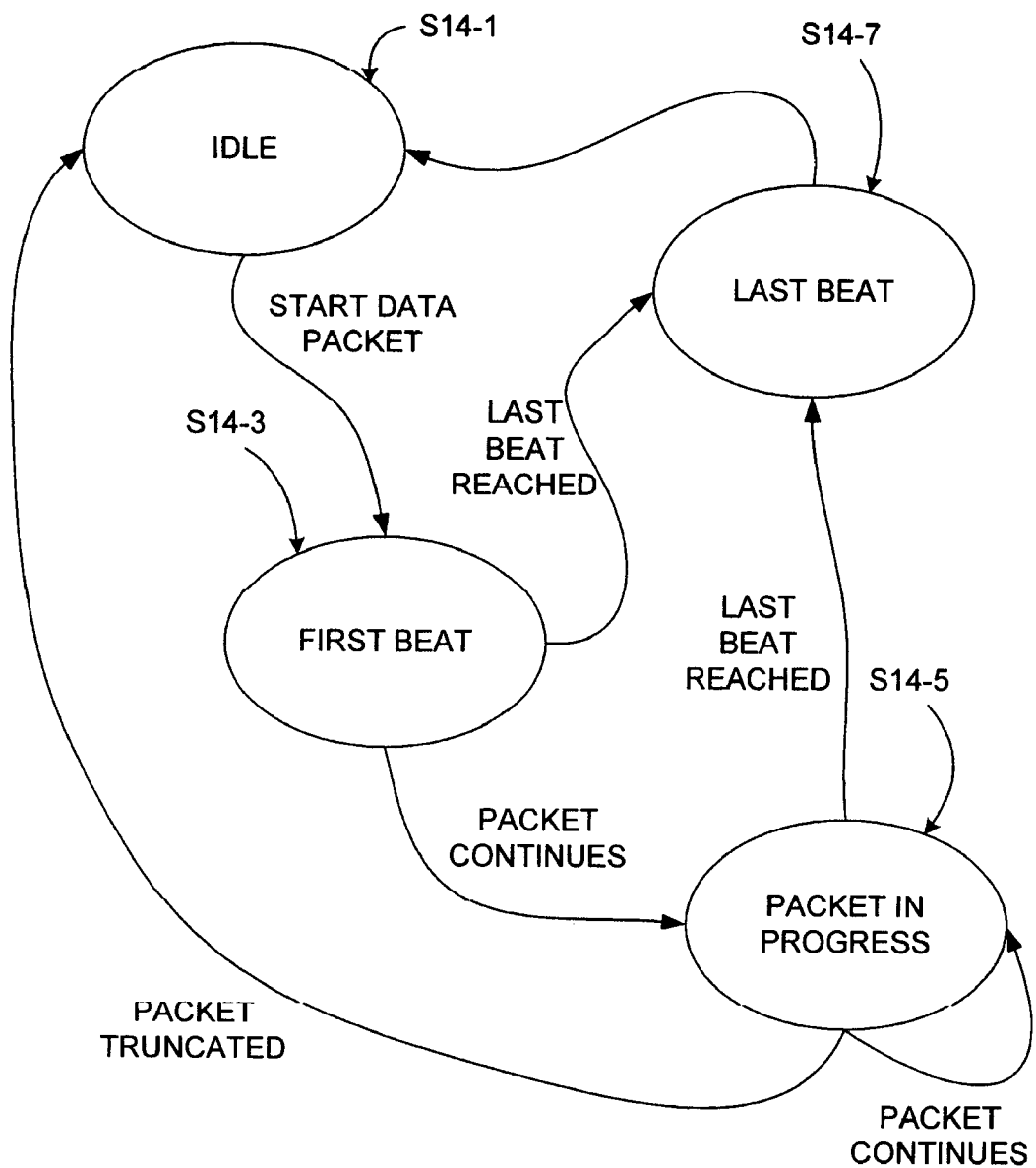
FIG. 14 is a schematic representation of a state machine for monitoring a packet length.

The packet length is determined by a Packet Length State Machine 152. The operation of the state machine 152 is illustrated in more detail in FIG. 14. The state machine determines the packet length on the basis of the information in the length of packet field 131 extracted from the packet. When the state machine detects the start of an incoming packet it moves from an idle state S14-1 to a first chunk state S14-3. On the first chunk of the packet, the result from CRC88 142 is always required, so the state machine always causes that output to be selected at the multiplexer 150. The state machine then subtracts 88 from the packet size indicated in the packet size header and proceeds to a packet in progress state S14-5 unless the remaining packet size is less than 96. If the remaining packet size is less than 96, then the state machine knows that the last chunk has been reached so a last chunk state S14-7 is entered.

Once the state machine enters the packet in progress state S14-5, the state machine causes the output of CRC96 140 to be selected by the multiplexer 150. After each chunk, the state machine subtracts 96 from the remaining packet size and remains in the packet in progress state unless the new remaining packet size is less than 96. In such circumstances the last chunk state S14-7 is entered. In the last chunk state S14-7, the state machine chooses one of CRC72 144, CRC40 146 and CRC8 148 on the basis of the current remaining packet size, which will be one of 72, 40 or 8 depending upon the total packet length.

The only exception to this operation of the state machine is if the packet is truncated due to a P_Key violation. At this time the state machine 152 has no information regarding the new total length of the packet as that information is not included in the original packet length field of the packet. Thus the state machine 152 cannot assist in determining the truncated CRC value for a truncated packet. Thus upon receiving notification of a packet truncation, the state machine immediately returns to the idle state S14-1 and awaits the start of a new packet.

However, it has been recognised that the stumped VCRC value can be directly derived from a value which is ordinarily generated as a non-output value (i.e. internal, intermediate value) within the CRC generator during the cycle previous to the current cycle. As a P_Key violation always causes packet truncation at the same point within a packet, such that the final cycle of a truncated packet will always be 8 bits. Thus the CRC generator of the present example stores this value at 156 ready for use in the event of it being determined that the packet requires truncation. It is necessary to prepare the stumped VCRC value on a rolling basis as the partition key field does not always appear at exactly the same place in the packet, depending on the size and presence of other header fields which precede it in the packet. Thus if the packet requires sudden truncation, the stumped VCRC value can be used immediately and a clean stumping operation can be performed.

Returning to FIG. 13, the output of the multiplexer 150, as selected by the Packet Length state machine 152 passes through a Byte Swap/Invert unit 154. This is used in the present example, as the outputs of the CRC machines 140, 142, 144, 146 and 148 are in a different format to that required by the system (and by the CRC machines as inputs). Thus the byte swap/invert unit 154 inverts the bits (i.e. turns 1s onto 0s and vice versa), swaps the two bytes of the output total and then reverses the order of the bits within the bytes.

With reference to FIGS. 15*a* to *c*, this process will be illustrated by considering bits "a" to "p" as representing the 16 bits of the VCRC value. This illustration ignores the matter of inverting the values of the bits, which can be performed at any point during the swap/invert process. As shown in FIG. 15*a* the two bytes which make up the CRC value start off in order abcdef . . . p. The bytes are then swapped to provide the overall ordering ijk . . . pabc . . . h as shown in FIG. 15*b*. Finally, the individual bits of each byte are reversed in order to give the final arrangement of ponm . . . ba as shown in FIG. 15*c*.

The thus re-ordered and inverted CRC value is then ready for use by the CRC machines and by the remainder of the port 81. As the skilled addressee will appreciate, a hardware implementation to perform such a byte swap/invert operation can be implemented using inverter gates for the inversion and not requiring any gates for the swap. As will be appreciated the byte swap/invert could be incorporated into the path from each CRC machine to the multiplexer or within each CRC machine and the same overall result provided.

Thus there has now been described a method and apparatus for ensuring that a packet can be cleanly and efficiently stumped if required due to a partition boundary violation without slowing down the transfer of packets through an Infiniband device. Additionally, the method and apparatus do not require a significant of additional circuitry within the device, thereby suppressing a cost of producing the device.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An apparatus comprising:
   an input port configured to receive a packet;
   a status-determining mechanism configured to determine a transmission validity status of the packet;
   a truncation mechanism configured to truncate the packet in response to determining that the transmission validity status of the packet is negative;
   a checksum-determining mechanism configured to determine a checksum field for the truncated packet; and
   a forwarding mechanism configured to forward the truncated packet to an output port.

2. The apparatus of claim 1, wherein the status-determining mechanism is configured to use a partition information field of the packet to determine the transmission validity status.

3. The apparatus of claim 2, wherein the status-determining mechanism is configured to determine the transmission validity status to be negative if a partition membership characteristic of the output port indicates membership of a partition different to a partition described in the partition information field.

4. The apparatus of claim 3, wherein the apparatus has a plurality of output ports, wherein at least one output port has a partition membership characteristic for a first partition, and wherein at least one other output port has a partition membership characteristic for a second partition.

5. The apparatus of claim 4, wherein the partition membership characteristic for any given port describes membership of only a single partition.

6. The apparatus of claim 1, wherein the checksum field includes a cyclic redundancy check value.

7. The apparatus of claim 6, wherein the checksum-determining mechanism includes a cyclic redundancy check state machine.

8. The apparatus of claim 1, wherein the checksum-determining mechanism determines the checksum field before the status-determining mechanism determines the transmission validity status.

* * * * *

UNITED STATES PATENT AND TRADEMARK OFFICE
CERTIFICATE OF CORRECTION

PATENT NO.        : 7,257,758 B1
APPLICATION NO. : 10/863372
DATED             : August 14, 2007
INVENTOR(S)       : Brian Manula et al.

It is certified that error appears in the above-identified patent and that said Letters Patent is hereby corrected as shown below:

On the Title Page, Item (75), line 2:

Please delete "Sanduen" and replace with --Sandven-- so that the third-named inventor's name is properly listed as --Magne Sandven--.

Signed and Sealed this

Thirtieth Day of October, 2007

JON W. DUDAS
*Director of the United States Patent and Trademark Office*